US012795394B2

(12) United States Patent
Nam et al.

(10) Patent No.: US 12,795,394 B2
(45) Date of Patent: Nov. 10, 2026

(54) METHOD AND ELECTRONIC DEVICE FOR BUILDING DIGITAL TWIN BASED ON DATA OF BASE STATION IN COMMERCIAL NETWORK

(71) Applicant: SAMSUNG ELECTRONICS CO., LTD., Suwon-si (KR)

(72) Inventors: Yujin Nam, Suwon-si (KR); Seungmo Kim, Suwon-si (KR); Haksung Kim, Suwon-si (KR); Seowoo Jang, Suwon-si (KR); Gyeongmin Pyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 742 days.

(21) Appl. No.: 18/143,437

(22) Filed: May 4, 2023

(65) Prior Publication Data

US 2023/0362681 A1 Nov. 9, 2023

Related U.S. Application Data

(63) Continuation of application No. PCT/KR2023/006035, filed on May 3, 2023.

(30) Foreign Application Priority Data

May 4, 2022 (KR) ........................ 10-2022-0055727
Sep. 19, 2022 (KR) ........................ 10-2022-0118155

(51) Int. Cl.
*H04W 24/02* (2009.01)
*H04W 24/06* (2009.01)
*H04W 24/08* (2009.01)

(52) U.S. Cl.
CPC .......... *H04W 24/02* (2013.01); *H04W 24/06* (2013.01); *H04W 24/08* (2013.01)

(58) Field of Classification Search
CPC ..... H04W 24/02; H04W 24/06; H04W 24/08; H04L 41/145
See application file for complete search history.

(56) References Cited

U.S. PATENT DOCUMENTS 8,682,812 B1 3/2014 Ranjan
8,862,074 B2 10/2014 Hamalainen
(Continued)

FOREIGN PATENT DOCUMENTS

CN 101141765 A 3/2008
CN 114189888 A 3/2022
(Continued)

OTHER PUBLICATIONS

Choi, M., et al. "Scenario Compaction and Ensemble with RAN Digital Twin for Efficient and Robust Learning", Globecom, (2022), 6 pages.
(Continued)

*Primary Examiner* — Kevin T Bates
*Assistant Examiner* — Hector Reyes
(74) *Attorney, Agent, or Firm* — Sughrue Mion, PLLC

(57) ABSTRACT

An electronic device includes a memory storing instructions, a transceiver configured to receive base station data, and at least one processor configured to execute the instructions to: divide the base station data into a plurality of pieces of base station data according to a first time unit; generate first data of the first time unit by superimposing the plurality of pieces of base station data on each other; divide the first data of the first time unit into a plurality of second time intervals, according to a second time interval unit; calculate at least one probability density function for each second time interval of the plurality of second time intervals; generate at least one first representative data by using respective probability density functions of the plurality of second time intervals;
(Continued)

and train the base station model, based on the at least one first representative data.

20 Claims, 5 Drawing Sheets

(56) References Cited

U.S. PATENT DOCUMENTS

| | | | | |
|---|---|---|---|---|
| 9,439,081 | B1 | 9/2016 | Knebl et al. | |
| 10,716,019 | B1 * | 7/2020 | Velusamy | H04W 24/06 |
| 10,841,853 | B1 * | 11/2020 | Yousefi'zadeh | G06N 3/0499 |
| 11,190,266 | B1 * | 11/2021 | Black | H04W 24/04 |
| 11,296,936 | B2 | 4/2022 | Johnson et al. | |
| 11,375,255 | B1 * | 6/2022 | Ramalingam | H04L 41/142 |
| 11,696,153 | B2 | 7/2023 | Chen et al. | |
| 2015/0045008 | A1 | 2/2015 | Karla | |
| 2016/0212633 | A1 * | 7/2016 | Flanagan | H04W 4/02 |
| 2019/0149425 | A1 * | 5/2019 | Larish | H04L 41/145<br>706/16 |
| 2020/0196155 | A1 | 6/2020 | Bogineni et al. | |
| 2021/0097409 | A1 | 4/2021 | Reynolds | |
| 2021/0174264 | A1 | 6/2021 | Jordan et al. | |
| 2021/0241141 | A1 | 8/2021 | Dugger et al. | |
| 2021/0250230 | A1 | 8/2021 | Johnson et al. | |
| 2021/0344582 | A1 | 11/2021 | Samadi | |
| 2021/0357722 | A1 | 11/2021 | Jang et al. | |
| 2022/0131764 | A1 | 4/2022 | Lee et al. | |
| 2022/0361011 | A1 | 11/2022 | Uusitalo et al. | |
| 2023/0032030 | A1 | 2/2023 | Choi et al. | |
| 2023/0206060 | A1 * | 6/2023 | Lukens | H04L 41/064<br>706/20 |
| 2024/0007961 | A1 * | 1/2024 | Korpi | H04W 52/225 |

FOREIGN PATENT DOCUMENTS

| | | | |
|---|---|---|---|
| JP | 2019-97001 | A | 6/2019 |
| JP | 2021-78076 | A | 5/2021 |
| KR | 10-2021-0094368 | A | 7/2021 |
| KR | 10-2021-0141323 | A | 11/2021 |
| KR | 10-2340258 | B1 | 12/2021 |
| KR | 10-2022-0055363 | A | 5/2022 |
| KR | 10-2023-0017712 | A | 2/2023 |
| WO | 2021/191754 | A1 | 9/2021 |
| WO | 2022/008954 | A1 | 1/2022 |
| WO | 2022/018304 | A1 | 1/2022 |
| WO | 2021/18370 | A1 | 2/2022 |
| WO | 2022/104324 | A1 | 5/2022 |

OTHER PUBLICATIONS

Choi, M., et al., "Temporally Efficient Learning using Data Compaction for Bespoke Cell On/Off Parameter Optimization", Globecom, (2022), 5 pages.

International Search Report (PCT/ISA/210) and Written Opinion (PCT/ISA/237) issued by the International Searching Authority on Jul. 26, 2023 in corresponding International Application No. PCT/KR2023/006031.

International Search Report (PCT/ISA/210) and Written Opinion (PCT/ISA/237) issued by the International Searching Authority on Jul. 28, 2023 in corresponding International Application No. PCT/KR2023/006035.

Communication dated Feb. 14, 2025 issued by the European Patent Office in European Patent Application No. 23799676.4.

Fernandes Gilberto Jr et al., "A comprehensive survey on network anomaly detection", Baltzer Science Publishers, vol. 70, No. 3, Jul. 2, 2018, XP036705363, DOI: 10.1007/S11235-018-0475-8, pp. 447-489 (43 pages total).

Lu Yao et al., "A GRU-based Prediction Framework for Intelligent Resource Management at Cloud Data Centres in the age of 5G", IEEE Transactions on Cognitive Communications and Networking, IEEE, USA, vol. 6, No. 2, Nov. 19, 2019, XP011792488, DOI:10.1109/TCCN.2019.2954388, pp. 486-498 (13 pages total).

* cited by examiner

METHOD AND ELECTRONIC DEVICE FOR BUILDING DIGITAL TWIN BASED ON DATA OF BASE STATION IN COMMERCIAL NETWORK

CROSS-REFERENCE TO RELATED APPLICATIONS

This is a bypass continuation of International Application No. PCT/KR2023/006035, filed May 3, 2023, which claims priority to Korean Patent Application No. 10-2022-0055727, filed on May 4, 2022, and Korean Patent Application No. 10-2022-0118155, filed on Sep. 19, 2022, in the Korean Intellectual Property Office, the disclosures of which are incorporated by reference herein in their entireties.

BACKGROUND

1. Field

The disclosure relates to an electronic device for building a digital twin based on data of a base station in a commercial network and a method, performed by the device, of building the digital twin.

2. Description of Related Art

A digital twin may refer technology used to simulate an operation, a setting state, etc. of an actual base station and uses a simulator to predict an operating environment of the actual base station. When a new wireless communication algorithm is developed, the performance of the developed algorithm may be evaluated in an arbitrary simulator environment in which an operating environment of an actual base station is not reflected. Also, for reinforcement learning, learning and evaluation are performed by using the arbitrary simulator environment, rather than the operating environment of the actual base station.

When a result of the evaluation of the performance of the simulator of the digital twin, the result reflecting the arbitrary simulator environment, may be applied to a commercial network, a large difference from the actual performance may occur due to a difference from an actual environment. Also, a reinforcement learning model used for the simulator may be trained using an optimum parameter from a result based on an interaction with an environment. Thus, when the learning model is trained in an environment different from an actual commercial network, the learning model may not be accurately trained.

SUMMARY

In accordance with an aspect of the disclosure, an electronic device for building a digital twin with respect to a network base station includes a memory configured to store one or more instructions and a simulator of the digital twin; a transceiver; and at least one processor configured to execute the one or more instructions to: obtain at least one simulated key performance indicator (KPI) by providing, to the simulator, information indicating whether or not a function of the network base station is activated, an operation parameter related to an operation of the network base station, and at least one input parameter to replicate the network base station, which are received through the transceiver; calculate a degree of similarity between the at least one simulated KPI and at least one network KPI received through the transceiver; and update the at least one input parameter, based on the calculated degree of similarity.

In accordance with an aspect of the disclosure, a method of building a digital twin includes obtaining information indicating whether or not a function of a network base station is activated, an operation parameter related to an operation of the network base station, and at least one network key performance indicator (KPI); obtaining at least one simulated KPI by providing, to a simulator, the information indicating whether or not the function is activated, the operation parameter, and at least one input parameter to replicate the network base station; calculating a degree of similarity between the at least one simulated KPI and the at least one network KPI; and updating the at least one input parameter based on the calculated degree of similarity.

In accordance with an aspect of the disclosure, a non-transitory computer-readable recording medium configured to store instruction which, when executed by at least one processor, cause the at least one processor to: obtain at least one simulated key performance indicator (KPI) by providing, to a simulator, information indicating whether or not a function of a network base station is activated, an operation parameter related to an operation of the network base station, and at least one input parameter to replicate the network base station, which are received through a transceiver; calculate a degree of similarity between the at least one simulated KPI and at least one network KPI received through the transceiver; and update the at least one input parameter, based on the calculated degree of similarity.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
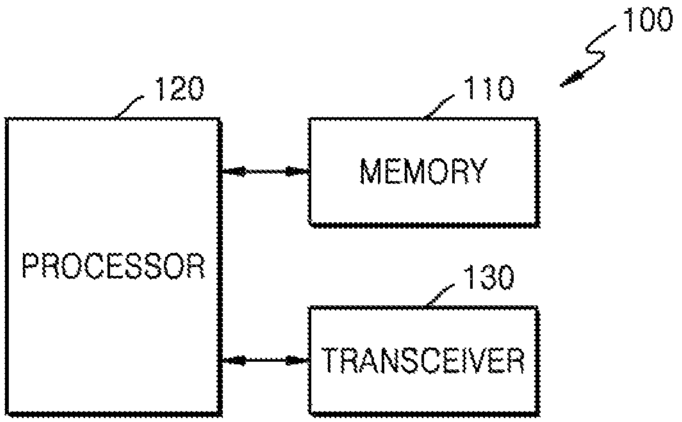
FIG. 1 is a block diagram showing components of an electronic device according to an embodiment.

Throughout the disclosure, the expression "at least one of a, b or c" indicates only a, only b, only c, both a and b, both a and c, both b and c, all of a, b, and c, or variations thereof.

Hereinafter, embodiments are described in detail with reference to the accompanying drawings for one of ordinary skill in the art to easily execute the disclosure. However, the disclosure may have different forms and should not be construed as being limited to the embodiment of the disclosure described herein. Also, in the drawings, parts not related to descriptions are omitted for the clear description of the disclosure, and throughout the specification, like reference numerals are used for like elements.

In the disclosure, general terms that have been widely used nowadays are selected, when possible, in consideration of functions of the disclosure, but non-general terms may be selected according to the intentions of technicians in the art, precedents, new technologies, etc. Also, some terms may be arbitrarily chosen by the present applicant. In this case, the meanings of these terms will be explained in corresponding parts of an embodiment of the disclosure in detail. Thus, the terms used herein should be defined not based on the names thereof but based on the meanings thereof and the whole context of the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

Also, terms such as "unit," "module," etc. used in the specification, refer to a unit that processes at least one function or operation, and this may be implemented by hardware, software, or a combination of hardware and software.

Herein, when a part is referred to as being "connected" to other parts, the part may be "directly connected" or "physically connected" to the other parts or may be "electrically connected" to the other parts with other devices therebetween. In the disclosure, terms such as "transmit," "receive," and "communication" indicate both direct communication and indirect communication. Also, it will be understood that when an element is referred to as "including" or "comprising" an element, the element may further include another element, rather than excluding the other element, unless mentioned otherwise.

Throughout the disclosure, unless particularly otherwise described, the term "or" is inclusive and not exclusive. Therefore, unless apparently or contextually otherwise indicated, the term "A or B" may indicate "A," "B," or "both A and B." In the disclosure, the phrase "at least one of" or one or more" may include a combination of one or more different items from among listed items or may denote a case in which only one arbitrary item is needed from among the listed items. For example, the phrase "at least one of A, B, and C" may include an arbitrary example of the following combinations: A, B, C, A and B, A and C, B and C, or A, B, and C.

A "controller" may indicate an arbitrary device, an arbitrary system, or part of the arbitrary device or system configured to control at least one operation. The controller may be implemented as hardware, a combination of hardware and software, or firmware. Functions associated with a particular controller may be local, remotely focused, or distributed.

Various embodiments of the disclosure described below may be implemented or supported by one or more computer programs, and the computer programs may be formed from computer-readable program codes and may be recorded in computer-readable media. In the disclosure, an "application" and a "program" may indicate one or more computer programs, software components, instruction sets, procedures, functions, objects, classes, instances, or pieces of related data, or part thereof, appropriate to be implemented by the computer-readable program codes. The "computer-readable program codes" may include various types of computer codes including a source code, a target code, and an executable code. The "computer-readable media" may include various types of media accessible by a computer, such as read only memory (ROM), random access memory (RAM), a hard disk drive (HDD), a compact disc (CD), a digital video disc (DVD), or various types of memories.

Also, the computer-readable media may be provided in the form of non-transitory storage media. Here, the "non-transitory storage media" may be tangible devices and may exclude wired, wireless, optical, or other communication links configured to transmit transitory electrical or other signals. The "non-transitory storage media" does not distinguish a case in which data is semi-permanently stored in the storage media from a case in which data is temporarily stored in the storage media. For example, the "non-transitory storage media" may include a buffer in which data is temporarily stored. The computer-readable recording media may be arbitrary available media accessible by a computer and includes all of volatile and non-volatile media and detachable and non-detachable media. The computer-readable recording media include media in which data may be permanently stored and media in which data may be stored and later overwritten, for example, a re-writable optical disk or an erasable memory device.

Methods according to various embodiments of the disclosure described herein may be provided as an inclusion of a computer program product. The computer program product may be transacted between a seller and a purchaser, as a product. The computer program product may be distributed in the form of a device-readable storage medium (e.g., a CD-ROM), or may be distributed online (e.g., download or upload), through an application store (e.g., Play Store™) or directly between two user devices (e.g., smartphones). In the case of the online distribution, at least a part of the computer program product (e.g., a downloadable application) may be at least temporarily stored in a machine-readable storage medium, such as a server of a manufacturer, a server of an application store, or a memory of a relay server, or may be temporarily generated.

Other definitions of particular words and phrases may be provided throughout the disclosure. One or ordinary skill in the art may understand that the defined words and phrases may be applied to past and future uses in various cases.

Each of the elements to be described hereinafter in this specification may additionally perform some or all of functions performed by other elements, in addition to a main function of each of the elements, and the other elements may exclusively perform some of the main functions of the respective elements.

In the specification, an "artificial neural network" is a representative example of an artificial neural network model replicating brain neurons and is not limited to an artificial neural network model using a predetermined algorithm. A neural network may also be referred to as a deep neural network.

According to embodiments, a digital twin may refer to a digital replication or virtual prototype of a network, which may be executed in parallel with a physical network. For a simulator of the digital twin to realize an environment similar to an actual base station, the simulator may receive an input parameter of a predetermined range and evaluate the performance, and the performance of the input parameter based on the evaluation may be used for training a simulator model. When a result of the performance evaluation of the simulator of the digital twin, which may be generated by applying the predetermined input parameter to the simulator, is applied to a commercial network, a large difference from the actual performance may occur, due to a difference from an actual environment.

Thus, the original function of the digital twin, which is to establish a virtual environment similar to an actual environment by using actual data, and therefore to apply a new algorithm and predict a future environment, may not be properly performed.

Therefore, an electronic device according to an embodiment of the disclosure may compare the performance between data of an actual base station and a simulator, so that the simulator may have the same function, configuration, and performance index range as the base station in a commercial network, in order to obtain accurate prediction data for building a digital twin. Also, the electronic device according to an embodiment of the disclosure may establish an environment similar to the actual base station by receiving data approximate to data used in the base station of the actual commercial network.

Hereinafter, an of the electronic device for building the digital twin is described. In embodiments, the electronic device may be configured to generate an environment similar to an actual base station by using data of a network base station, for example a commercial network base station.

FIG. 1 is a block diagram showing components of an electronic device according to an embodiment of the disclosure.

Referring to FIG. 1, the electronic device 100 according to an embodiment of the disclosure may include a memory 110, a processor 120, and a transceiver 130. According to various embodiments of the disclosure, the components of the electronic device 100 are not limited to those illustrated in FIG. 1. For example, in embodiments the electronic device 100 may include components not illustrated in FIG. 1 or may omit some of the components illustrated in FIG. 1. For example, FIG. 1 illustrates an example in which the electronic device 100 builds a digital twin via operations of the processor 120. However, the operations of the processor 120 may be implemented by software stored in the memory 110 and may be stored as software. Also, the electronic device 100 may further include an input interface configured to receive a parameter of a simulator from a user and an output interface configured to output a simulation result.

Also, the operations of the processor 120, examples of which are described below may be implemented by software modules stored in the memory 110. For example, the software modules may be stored in the memory 110 and may be executed by the processor 120 to perform the operations.

The memory 110 may be electrically connected to the processor 120 and may store commands or data related to operations of the components included in the electronic device 100. According to various embodiments of the disclosure, the memory 110 may store information related to a network state of a base station, obtained by using the transceiver 130, a value of a state control parameter, calculated by a state control parameter value calculation module, instructions with respect to the operations, or the like.

According to an embodiment of the disclosure, when at least some modules included in each of units generated by conceptually dividing functions of the simulator of the digital twin and the electronic device 100, examples of which are described below, are implemented by the software executed by the processor 120, the memory 110 may store instructions for executing the software modules.

The processor 120 may be electrically connected to the components included in the electronic device 100 and may perform an operation or data processing in relation to controlling and/or communication of the components included in the electronic device 100. According to an embodiment of the disclosure, the processor 120 may be configured to process a command or data received from at least one of other components by loading the command or data in the memory 110 and may store resultant data in the memory 110.

Also, although FIG. 1 illustrates that the processor 120 operates as one processor 120, for convenience of explanation, the functions of at least some modules included in each unit generated by conceptually dividing the functions of the simulator of the digital twin and the electronic device 100 may be implemented by a plurality of processors. In this case, the processor 120 may operate not as a single processor, and may be configured such that a plurality of processors may be implemented by separate pieces of hardware to perform separate operations. However, embodiments are not limited thereto.

The transceiver 130 may establish a wired or wireless communication channel between the electronic device 100 and another electronic device outside of or otherwise external to the electronic device 100, and may support communication through the established communication channel. According to an embodiment of the disclosure, through wired communication or wireless communication, the transceiver 130 may receive data from the other electronic device outside the electronic device 100, or transmit data to an electronic device including a server configured to control another base station outside the electronic device 100.

The data received by the transceiver 130 according to an embodiment of the disclosure may be data with respect to at least one actual commercial network base station. The data with respect to the at least one actual commercial network base station may include at least one of information indicating whether or not a function is activated, an operation parameter, or at least one network key performance indicator (KPI), for example a commercial KPI. Here, the at least one commercial network base station may have information indicating whether or not different functions are activated, the operation parameter, and the commercial network KPI, and the transceiver 130 may receive the information indicating whether or not the functions are activated, the operation parameter, and the commercial network KPI for each base station.

According to various embodiments of the disclosure, the transceiver 130 may include a wireless communication module (e.g., a cellular communication module, a short-range wireless communication module, or a global navigation satellite system (GNSS) communication module) or a wired communication module (e.g., a local area network (LAN) communication module or a power line communication module) and by using a corresponding communication module, may communicate with an external electronic device through a short-range wireless communication network (e.g., Bluetooth, Wifi direct, or infrared data association (IrDA)) or a remote communication network (e.g., a cellular network, the Internet, or a computer network (e.g., a LAN or a wide area network (WAN))).

Hereinafter, examples of functions of the electronic device 100, and operations of units performing example functions, are described below with reference to FIG. 2.

Figure 2:
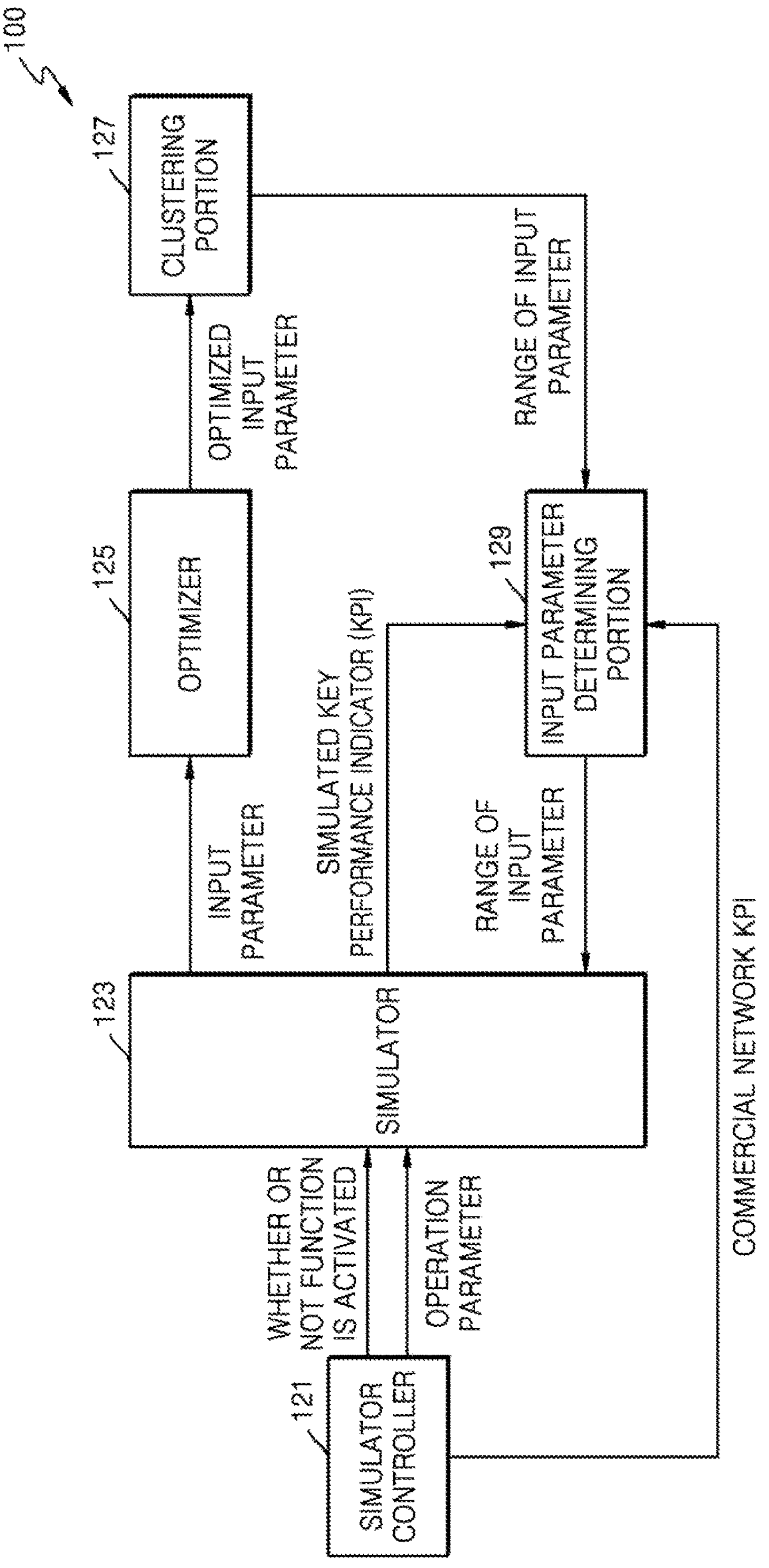
FIG. 2 is an example diagram showing functions of the electronic device illustrated in FIG. 1.

FIG. 2 is an example diagram showing functions of the electronic device 100 illustrated in FIG. 1.

Referring to FIG. 2, the electronic device 100 may include a simulator controller 121, a simulator 123, an optimizer 125, a clustering portion 127, and an input parameter determining portion 129. For example, according to embodiments, the simulator controller 121, the simulator 123, the optimizer 125, the clustering portion 127, and the input parameter determining portion 129 may be implemented using at least one processor such as the processor 120.

For convenience of explanation, the simulator 123 illustrated in FIG. 2 is described as operating via the processor 120 of FIG. 1. However, embodiments are not limited thereto. For example, the simulator 123 may operate by being stored in the memory 110, and the functions of one or more of the simulator controller 121, the optimizer 125, the clustering portion 127, and the input parameter determining portion 129 may be performed via operations of the processor 120. Also, the simulator 123 according to an embodiment of the disclosure may be implemented as an additional external device. In this case, the electronic device 100 may transmit, to the simulator 123, input data that is input, or receive, from the simulator 123, output data, by using the transceiver 130.

According to an embodiment of the disclosure, the operation of each unit and the operation of the simulator 123 illustrated in FIG. 2 may correspond to the operations of the processor 120 of FIG. 1 sub-divided according to functions. Also, the operation of each unit and the operation of the simulator 123 illustrated in FIG. 2 may be stored as software in the memory 110 of FIG. 1 and may be performed when the software is executed by the processor 120. However, embodiments are not limited thereto.

Also, FIG. 2 illustrates the simulator controller 121, the simulator 123, the optimizer 125, the clustering portion 127, and the input parameter determining portion 129 as being separate modules or units. However, the simulator controller 121, the simulator 123, the optimizer 125, the clustering portion 127, and the input parameter determining portion 129 may be implemented by one processor, for example the processor 120. In this case, the simulator controller 121, the simulator 123, the optimizer 125, the clustering portion 127, and the input parameter determining portion 129 may be implemented by a dedicated processor or by a combination of a general-purpose processor, such as an application processor (AP), a central processing unit (CPU), or a graphics processing unit (GPU), with software (S/W).

According to an embodiment of the disclosure, the simulator controller 121, the simulator 123, the optimizer 125, the clustering portion 127, and the input parameter determining portion 129 may include or be implemented using a plurality of processors. In this case, the simulator controller 121, the simulator 123, the optimizer 125, the clustering portion 127, and the input parameter determining portion 129 may be implemented by a combination of dedicated processors or by a combination of a plurality of general-purpose processors including an AP, a CPU, a GPU, etc. with S/W.

The simulator controller 121 according to an embodiment of the disclosure may obtain, from the transceiver 130 of FIG. 1, information indicating whether or not a function of an actual commercial network base station is activated, an operation parameter, and a commercial network KPI. The simulator controller 121 may input environment setting information of the simulator 123 by using the obtained information indicating whether or not the function is activated and the obtained operation parameter.

The information indicating whether or not the function of the commercial network base station is activated may indicate whether or not the function is activated so that the base station in the actual commercial network and a base station replicated in the digital twin may perform the same function. For example, the information indicating whether or not the function is activated according to an embodiment of the disclosure may include information about whether or not at least one of a scheduling algorithm of the base station, a handover algorithm of the base station, or a discontinuous reception (DRX) algorithm is activated.

The operation parameter may be configured such that the base station in the actual commercial network and the base station replicated in the digital twin may have the same setting value. For example, the operation parameter according to an embodiment of the disclosure may include at least one of a handover parameter with respect to the base station, a selection or re-selection parameter, a cell on/off parameter, or a load balancing parameter.

The simulator controller 121 according to an embodiment of the disclosure may determine a type of an input parameter by using an obtained commercial network KPI. Here, the input parameter may be a value related to the commercial network KPI, and when the simulation of the simulator 123 is performed, the input parameter may affect the commercial network KPI.

The KPI may denote a performance index configured to properly or accurately reflect the characteristic of a base station. For example, the KPI may include at least one of throughput of a cell, the number of activated terminals, a use amount of a physical resource block (PRB), or a download (DL) size, collected at a predetermined time of the base station. However, the described KPI is only an example, and any KPI may be used according to a purpose of the base station.

Here, the number of activated terminals may denote an average number of terminals having data to receive or transmit during a predetermined time period. Also, the use amount of the PRB may denote a ratio between the total number of available PRBs and the number of PRBs actually used, during a predetermined time period. The DL size may denote the total amount of data transmitted during a predetermined time period. The throughput of the cell may denote an average amount of data per unit time transmitted during a predetermined time period.

The predetermined time period may vary from several minutes to several hours according to the setting of a user.

The electronic device 100 according to an embodiment of the disclosure may differently receive the KPI with respect to the actual commercial network according to an environment of the commercial network. For example, the environment of the commercial network may vary according to base stations and may be different for each time slot.

In other words, the electronic device 100 may receive a different input parameter according to each base station or each time slot. In this case, the commercial network KPI obtained by the simulator controller 121 may be grouped and managed according to each base station or each time slot.

For example, when a first base station and a second base station are being used, and a KPI item indicates a cell throughput, the number of activated terminals, and the use amount of the PRB in the commercial network data obtained by the electronic device 100, the simulator controller 121 may set the cell throughput, the number of activated terminals, and the use amount of the PRB with respect to the first base station as a first KPI group. Also, the simulator controller 121 may set the cell throughput, the number of activated terminals, and the use amount of the PRB with respect to the second base station as a second KPI group.

The input parameter may denote a parameter affecting the KPI, which may be one of the simulation results of the simulator of the digital twin. For example, the input parameter may include at least one of an average size of a packet, an average request interval, or the number of terminals. However, the input parameter described above is only an example, and a parameter affecting the KPI may be set according to the KPI of the base station described above.

For example, when the number of base stations is S, and a predetermined number of items of the input parameter is N, the total number of input parameters obtained by the electronic device 100 may be NS. In embodiments, when the number of time slots divided according to a predetermined time interval configured based on a predetermined criterion is S, and a predetermined number of items of the input parameter is N, the total number of input parameters obtained by the electronic device 100 may be NS. The electronic device 100 according to an embodiment of the disclosure may update the input parameter to generate a simulation KPI similar to the commercial network KPI, by using the total number of input parameters that are received.

With respect to each of the configured input parameters described above, the electronic device 100 according to an embodiment of the disclosure may determine an input range by using data of the base station in the actual commercial network. Hereinafter, with respect to the configured input parameter, a method of determining the range of the input parameter is described based on the operation of units or modules of the electronic device 100. In embodiments, the method may be performed by the electronic device 100 using the commercial network KPI of the base station of the actual commercial network.

The simulator 123 included in the digital twin may simulate an operation result of a base station generated by replicating an actual base station, with respect to an input parameter and environment. Also, the simulator 123 may output a plurality of simulated KPIs with respect to the operation result based on input parameter and environment. Here, the simulated KPI may denote a numerical value with respect to each of performance evaluation items of a base station.

The optimizer 125 according to an embodiment of the disclosure may receive the input parameter from the simulator 123 and may generate an optimized input parameter by using a repetition-based optimization algorithm. In embodiments, the optimizer 125 may generate the optimized input parameter by receiving the input parameter from the input parameter determining portion 129, an example of which is described below.

Figure 3:
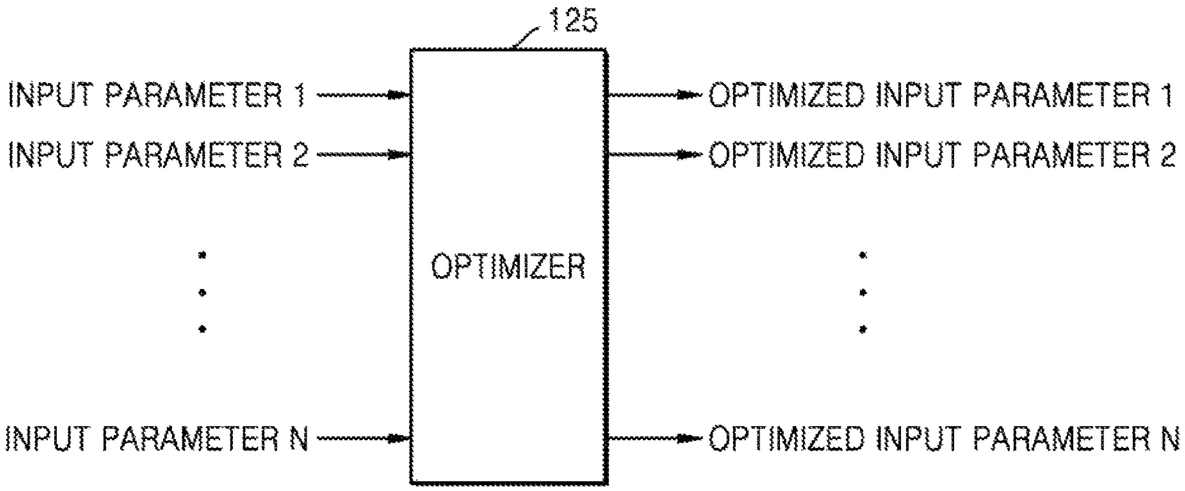
FIG. 3 shows an input and an output for an electronic device to optimize an input parameter, according to an embodiment.

FIG. 3 shows an input and an output for an electronic device 100 to optimize an input parameter according to an embodiment of the disclosure.

Referring to FIG. 3, the optimizer 125 may receive N input parameters, including for example input parameter 1, input parameter 2, through input parameter N, and may output optimized input parameter 1, optimized input parameter 2, through optimized input parameter N, by optimizing the input parameter 1 through the input parameter N.

Here, the input parameters corresponding to the input parameter 1 through the input parameter N may be values grouped for each base station or each time slot. For example, when the input parameters that are input to a first base station include a first input parameter 1 through a first input parameter N, the input parameters that are input to a second base station may also include a second input parameter 1 through a second input parameter N. In embodiments, when the input parameters that are input in a first time slot include a first input parameter 1 through a first input parameter N, the input parameters that are input in a second time slot may also include a second input parameter 1 through a second input parameter N. The optimizer 125 may group the plurality of input parameters for each base station or each time slot and may separately perform the optimization processes.

When the number of base stations is S, and a predetermined number of items of the input parameter is N, the total number of pieces of data received by the optimizer 125 may be NS, and the number of output optimized input parameters may also be NS. In this case, the optimizer 125 may obtain N optimized input parameters for each base station by performing a repetition-based optimization algorithm on N input parameters for each base station.

The optimizer 125 according to an embodiment of the disclosure may generate the plurality of optimized input parameters by using the repetition-based optimization algorithm including at least one of a genetic algorithm (GA) or a particle swarm optimization (PSO) algorithm by using the input parameter as an input.

Here, the GA may be a calculation model based on an evolutionary process of a natural world and may be one of methods of solving the optimization problem by using a global optimization scheme. The GA may be a representative evolutionary calculation method copying the evolution of living things and may a method of searching for an optimized value by using an evolutionary process.

The GA may generate values approximate to an accurate value by representing possible values with respect to a given problem in a predetermined form of a resource structure and gradually modifying the represented resource structure. Here, the resource structure representing the values may be referred to as genes, and the process of generating the value approximate to the accurate value by modifying the genes may be referred to as the evolution.

The GA may represent a value of the given problem in the form of genes, and a suitability with respect to the value may be calculated via a suitability function. A degree of suitability of the value generated via repetition of the GA as an answer for the problem may be assessed by using the suitability function. Also, the GA calculation may include selection, crossing, transition, substitution, etc.

The optimizer 125 according to an embodiment of the disclosure may receive the input parameter as an initial gene and may generate the optimized input parameter for each base station or each time slot by using the GA described above.

The PSO algorithm may be a repetitive optimization algorithm attempting a simulation of a social behavior. The PSO algorithm may simultaneously improve candidate values through repetitive calculations to ultimately achieve the optimization of a target function. Here, the motion of the candidate values may comply with a predetermined equation. The PSO algorithm may simultaneously process the plurality of candidate values.

In the PSO algorithm, N particles may be updated to gradually search for the value. The PSO algorithm may search for the optimized value by repeating the processes of speed calculation, location updating, and score evaluation, after initialization.

The optimizer 125 according to an embodiment of the disclosure may perform a particle initialization process on the input parameter and may generate the plurality of optimized input parameters by using the PSO algorithm performing the processes of speed calculation, location updating, and score evaluation.

Referring again to FIG. 2, the clustering portion 127 may cluster the plurality of input values and may determine the input range of the input values by using representative values of the clustered cluster, the representative values including a minimum value and a maximum value.

When the optimized input parameter generated by using the repetition-based optimization algorithm is input, the clustering portion 127 may generate at least one cluster by clustering similar input parameters among the optimized input parameter.

The clustering portion 127 may generate the at least one cluster using any clustering method. For example, the clustering portion 127 may cluster the input optimized input parameters by using a hierarchical clustering method or a point assignment clustering method.

Here, the hierarchical clustering method may include a top-down method whereby clusters are divided until all clusters have one element and a bottom-up method whereby two close clusters are merged repetitively until one cluster including all of the clusters is generated from the clusters each having a point as an element.

According to the point assignment clustering method, clustering may be performed by recording which element each cluster has, and a representative method thereof may include a K-means algorithm. According to the K-means algorithm, clustering may be performed by first determining k, the number of clusters, then, making k initial clusters by using k arbitrarily selected points, and then, repetitively changing the clusters.

The clustering portion 127 according to an embodiment of the disclosure may determine the range of the input parameter by using a minimum value and a maximum value of the optimized input parameters included in each cluster, with respect to the one or more clusters generated by clustering the optimized input parameters.

For example, when a minimum value and a maximum value of an average packet size determined as the input parameter in one cluster are 700 bytes and 1000 bytes, respectively, the clustering portion 127 may determine a range of the average packet size as 700 bytes to 1000 bytes. An input parameter may be set within the range of the input parameter determined by the clustering portion 127, and the input parameter may be input to the simulator 123 described above.

The input parameter determining portion 129 may receive a simulated KPI from the simulator 123, a target KPI from the simulator controller 121, and the input parameter range from the clustering portion 127. The input parameter determining portion 129 may calculate a degree of similarity between the received simulated KPI and a commercial network KPI and based on the calculated degree of similarity, may determine whether or not to repetitively perform optimization on the input parameter.

In order to calculate the degree of similarity between the simulated KPI and the commercial network KPI, the input parameter determining portion 129 may use a method of indicating the degree of similarity as a numerical value and comparing the degree of similarity. For example, the method performed by the input parameter determining portion 129 to calculate the degree of similarity may include calculating the degree of similarity by using model evaluation indexes, such as a root mean square error (RMSE), a mean absolute error (MAE), a mean absolute percentage error (MARE), etc.

The MAPE may indicate a percentage with respect to a sum of values obtained by dividing a difference between an actual value and a prediction value by an actual value, as shown in Equation 1. Thus, when the MAPE is used, the degree of similarity with respect to a KPI group and all KPI items is calculated by using one numerical value, and thus, the general degree of similarity between a KPI of an actual commercial network and the simulated KPI may be calculated by using one numerical value. Thus, calculation may be simplified.

$$MAPE = \frac{100}{mn}\sum_{j=1}^{m}\sum_{i=1}^{n}\frac{|Y_{j,i} - \hat{Y}_{j,i}|}{Y_{j,i}} \quad \text{Equation 1}$$

Here, m is the number of items of the KPI, n is the number of base stations or time slots, $Y_{j,i}$ may denote a value of a $j^{th}$ KPI item with respect to an $i^{th}$ KPI group in the actual commercial network, and $\hat{Y}_{j,i}$ may be a result of the simulation performed by the simulator 123 by using the input parameter and may be the value of the simulated KPI with respect to the $j^{th}$ KPI item with respect to the $i^{th}$ KPI group.

The RSME may be calculated as shown in Equation 2 below.

$$RMSE_j = \sqrt{\frac{1}{n}\sum_{i=1}^{n}(Y_{j,i} - \hat{Y}_{j,i})^2} \quad \text{Equation 2}$$

Here, $RMSE_j$ may denote a numerical value of the RMSE with respect to the $j^{th}$ KPI item.

The MAE may be calculated as shown in Equation 3 below.

$$MAE_j = \frac{1}{n}\sum_{i=1}^{n}|Y_{j,i} - \hat{Y}_{j,i}| \quad \text{Equation 3}$$

Here, $MAE_j$ may denote a numerical value of the MAE with respect to the $j^{th}$ KPI item.

For example, when the simulator controller 121 obtains the commercial network KPI from two base stations, and the KPI items include the number of terminals, a use amount of a PRB, and a throughput of a cell, the actual commercial network KPI and the simulated KPI may be obtained, an example of which is shown in Table 1 below.

TABLE 1

| | Commercial network KPI ($\hat{Y}_{j,i}$) | | | Simulated KPI ($\hat{Y}_{j,i}$) | | |
|---|---|---|---|---|---|---|
| | The number of users (terminals) | PRB (%) | Through-put (Mbps) | The number of users (terminals) | PRB (%) | Through-put (Mbps) |
| 1st | 1.3 | 32.4 | 7.2 | 1.2 | 35.4 | 6.9 |
| 2nd | 2.1 | 42.1 | 6.8 | 2.2 | 39.3 | 6.8 |

The input parameter determining portion 129 may calculate the MAPE between the commercial network KPI $Y_{j,i}$ collected for each KPI item and each base station and the simulated KPI $\hat{Y}_{j,i}$ output by inputting the input parameter to the simulator 123 by using the Equation 1 described above. In this case, as an example, m may be 3, n may be 2, and the calculated MAPE value may be 5.42%.

Also, when the input parameter determining portion 129 uses the RMSE, the RMSE with respect to the number of users calculated by using Equation 2 may be 0.1 terminals, the RMSE with respect to the PRB may be 2.9%, and the RMSE with respect to the throughput may be 0.21 Mbps.

Also, when the input parameter determining portion 129 uses the MAE, the MAE with respect to the number of users calculated by using Equation 3 may be 0.1 terminals, the MAE with respect to the PRB may be 2.9%, and the MAE with respect to the throughput may be 0.15 Mbps.

The input parameter determining portion 129 may store the calculated degree of similarity and the input parameter written in the simulated KPI in the memory 110 of FIG. 1.

Also, the input parameter determining portion 129 may compare a first degree of similarity stored in a previous repetitive operation with the calculated degree of similarity described above and may store the degree of similarity having a greater value from among the two, and the input parameter corresponding to the degree of similarity having the greater value in the memory 110 of FIG. 1. The input parameter determining portion 129 may repeat these operations and store the highest degree of similarity from among the degrees of similarities calculated in the respective repetitive operations, and the input parameter corresponding to the highest degree of similarity.

When the input parameter determining portion 129 uses the RMSE or the MAE, the degree of similarity may be sub-divided and stored for each KPI item.

After an updating operation of storing the highest degree of similarity and the input parameter corresponding thereto, the input parameter determining portion 129 may perform the optimization algorithm to obtain the input parameter which may output the simulated KPI which is closest to the commercial network KPI.

The input parameter determining portion 129 may input the input parameter having the highest degree of similarity to the simulator 123 and may repetitively update the input parameter based on the output simulator KPI.

Also, when a predetermined completion condition is satisfied in the process of updating the input parameter, the input parameter determining portion 129 may end the repetitive operations and determine the input parameter corresponding to the highest degree of similarity at a time point at which the termination condition is satisfied as the final input parameter.

Here, the completion condition input to the input parameter determining portion 129 may be predetermined. For example, the completion condition may be a condition for satisfying the predetermined number of repetitions or a condition of being greater than or equal to a predetermined degree of similarity.

The electronic device 100 may determine the final input parameter determined by the input parameter determining portion 129 as an input value for building the digital twin. Accordingly, the electronic device 100 according to an embodiment of the disclosure may generate various effects. For example, according to the electronic device 100, the base station in the digital twin may operate by reflecting the characteristics of the base station in the commercial network.

An example electronic device 100 for building the digital twin by using data of the actual base station in the commercial network is described above. Hereinafter, an example of a method, performed by the electronic device 100, of building the digital twin by using the data of the actual base station is described below.

Figure 4:
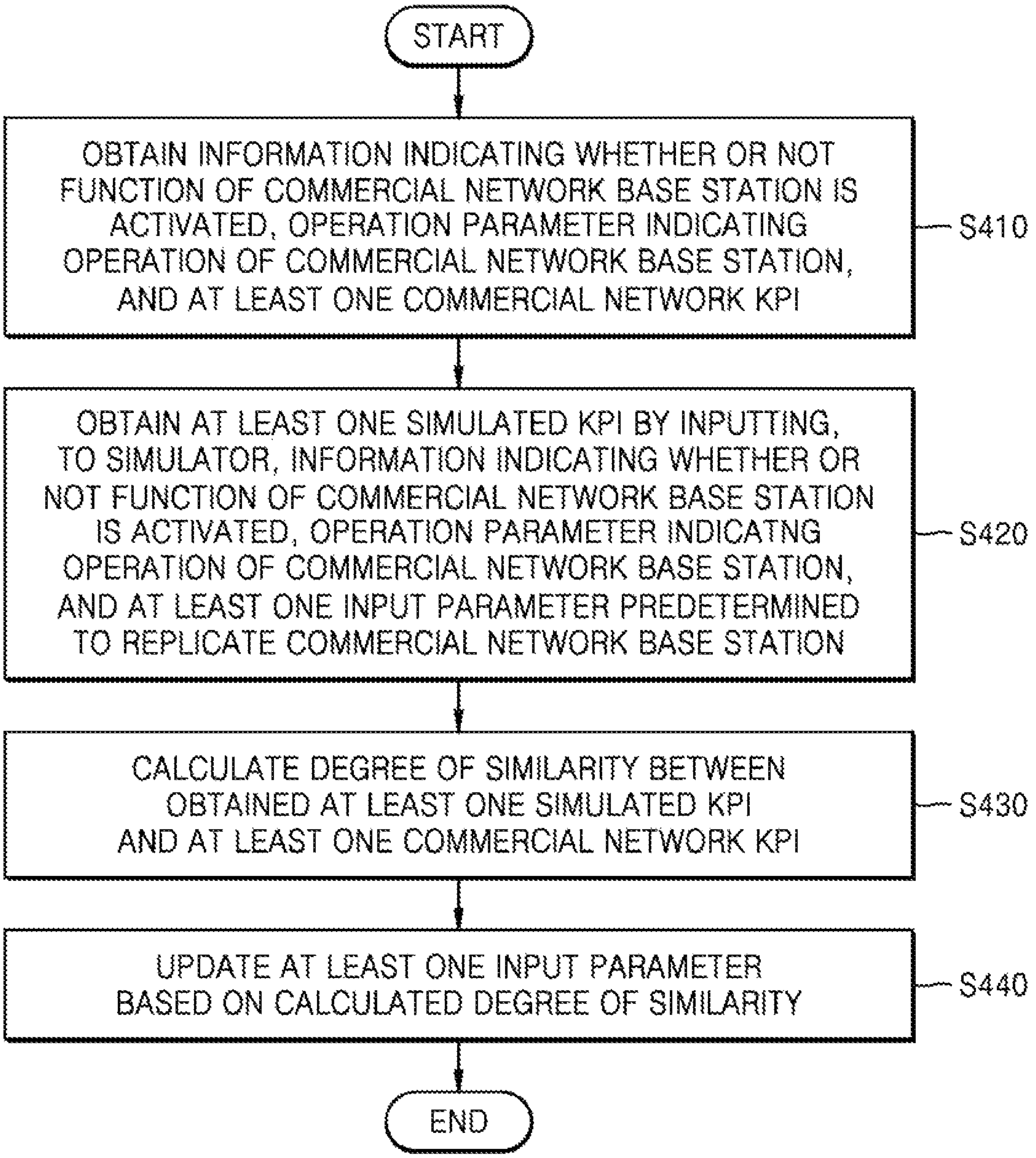
FIG. 4 is a flowchart of a method, performed by an electronic device, of building a digital twin based on data of a base station in a commercial network, according to an embodiment.

FIG. 4 is a flowchart of a method, performed by an electronic device 100, of building a digital twin based on data of a base station in a commercial network, according to an embodiment of the disclosure.

FIG. 4 is only an example, and orders of the operations of FIG. 4 may be changed, one or more operations may be simultaneously performed, or additional operations may be performed. For example, operation S420 and operation S430 of FIG. 4 may be simultaneously performed.

Referring to FIG. 4, the electronic device 100 may obtain information indicating whether or not a function of a commercial network base station is activated, an operation parameter indicating an operation of the commercial network base station, and at least one commercial network KPI in operation S410.

The information may denote whether or not the function of the commercial network base station is activated so that the base station in the actual commercial network and a base station replicated or simulated in the digital twin perform the same function. For example, the information indicating whether or not the function is activated according to an embodiment of the disclosure may include information about whether or not at least one of a scheduling algorithm of the base station, a handover algorithm of the base station, or a discontinuous reception (DRX) algorithm is activated.

The operation parameter may be configured such that the base station in the actual commercial network and the base station replicated or simulated in the digital twin may have the same setting value. The operation parameter according to an embodiment of the disclosure may include at least one of a handover parameter, a selection or re-selection parameter, a cell on/off parameter, or a load balancing parameter, with respect to the base station.

The KPI may denote a performance index which may accurately reflect the characteristics of the base station. For example, the KPI may include at least one of throughput of a cell, the number of activated terminals, a use amount of a PRB, or a DL size, collected at a predetermined time of the base station. However, the described KPI is only an example, and any KPI may be used according to a purpose of the base station.

Here, the number of activated terminals may denote an average number of terminals having data to receive or transmit during a predetermined time period. Also, the use amount of the PRB may denote a ratio between the total number of available PRBs and the number of PRBs actually used, during a predetermined time period. The DL size may denote the total amount of data transmitted during a predetermined time period. The throughput of the cell may denote an average amount of data per unit time transmitted during a predetermined time period.

Here, the predetermined time period may vary from several minutes to several hours according to the setting of a user.

According to the method of building the digital twin according to an embodiment of the disclosure, the KPI of the actual commercial network may be differently input according to an environment of the commercial network. For example, the environment of the commercial network may vary according to base stations and may be different for each time slot.

In other words, the electronic device 100 may receive a different input parameter according to each base station or each time slot. In this case, the commercial network KPI obtained by the electronic device 100 may be grouped and managed according to each base station or each time slot.

The electronic device 100 may obtain at least one simulated KPI by inputting, to a simulator, the information indicating whether or not the function of the commercial network base station is activated, the operation parameter indicating an operation of the commercial network base station, and at least one input parameter predetermined to replicate the commercial network base station, in operation S420.

When the simulated KPI is obtained, the electronic device 100 may calculate a degree of similarity between the obtained simulated KPI and the commercial network KPI, in operation S430.

In order to calculate the degree of similarity between the simulated KPI and the commercial network KPI, the electronic device 100 may use a method of indicating the degree of similarity as a numerical value and comparing the degree of similarity. For example, the method performed by the electronic device to calculate the degree of similarity may include calculating the degree of similarity by using model evaluation indexes, such as an RMSE, an MAE, an MAPE, etc.

The electronic device 100 may update the at least one input parameter based on the calculated degree of similarity in operation S440. The operation, performed by the electronic device 100, of updating the input parameter based on the calculated degree of similarity will be described below with reference to FIG. 5.

The electronic device 100 may repetitively perform a series of processes of updating the input parameter to determine a final input parameter. Thus, the electronic device 100 may build a digital twin similar to the actual commercial network base station.

Figure 5:
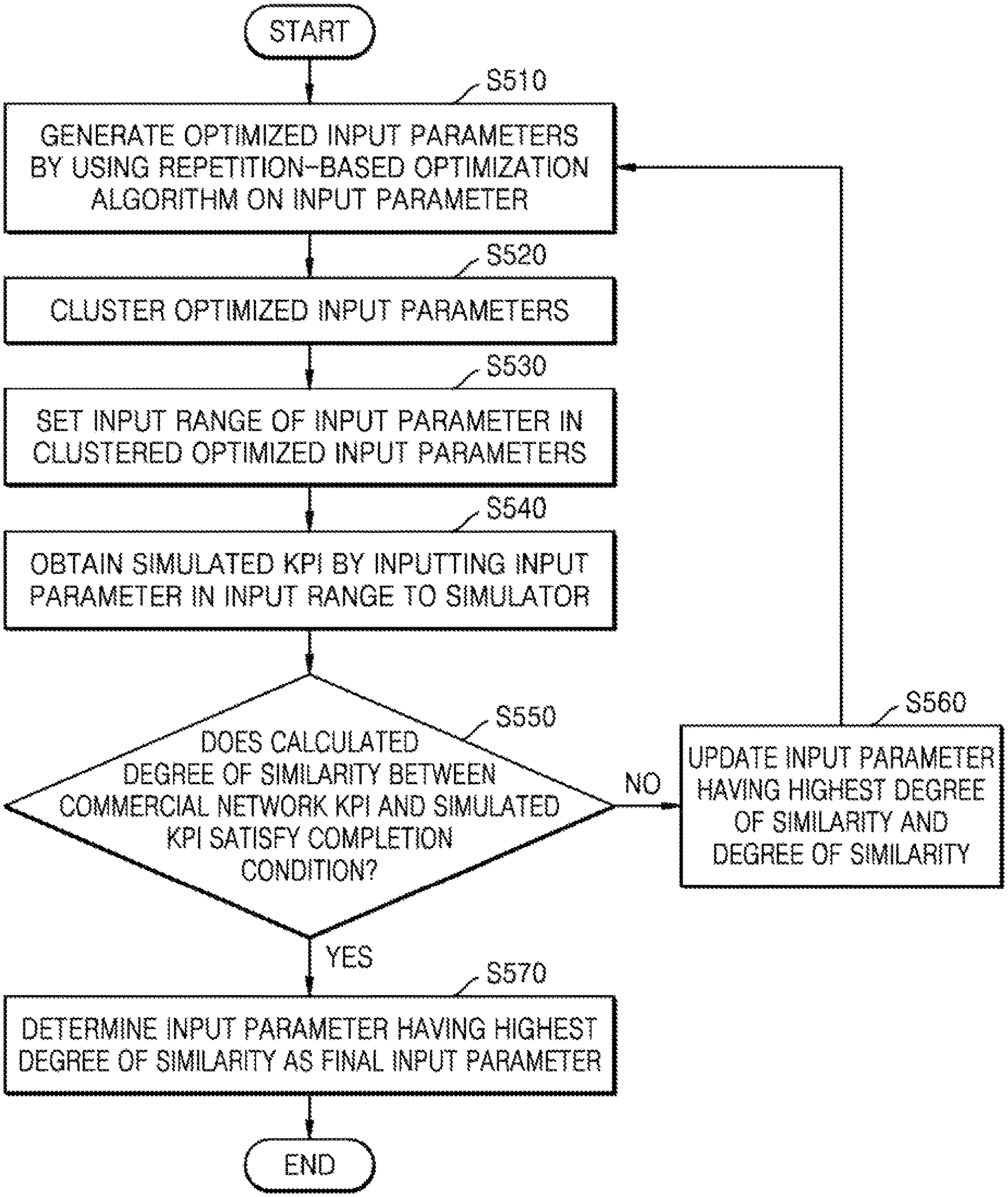
FIG. 5 is a flowchart of a method, performed by an electronic device, of updating an input parameter based on a key performance indicator (KPI) of a base station, according to an embodiment.

FIG. 5 is a flowchart of a method, performed by an electronic device, of updating an input parameter based on a KPI of a base station, according to an embodiment of the disclosure.

FIG. 5 is only an example, and orders of the operations of FIG. 5 may be changed, one or more operations may be simultaneously performed, or additional operations may be performed.

Referring to FIG. 5, the electronic device may generate an optimized input parameter by performing a repetition-based optimization algorithm on an input parameter in operation S510.

The electronic device 100 may generate a plurality of optimized input parameters by using the repetition-based optimization algorithm including at least one of a GA or a PSO algorithm by using the input parameter as an input. The GA and the PSO algorithm are described above.

The electronic device 100 may cluster the generated optimized input parameters in operation S520.

The electronic device 100 may generate at least one cluster by clustering similar input parameters from among the optimized input parameters. The electronic device 100 may use any method to cluster the optimized input parameters. For example, the clustering portion 127 may cluster the input optimized input parameters by using a hierarchical clustering method or a point assignment clustering method. Examples the hierarchical clustering method and the point assignment clustering method are described above.

The electronic device 100 may set an input range of the input parameter in the clustered optimized input parameters in operation S530.

Here, the input range of the input parameter may be determined by using a representative value of each cluster, for example, a minimum value, a maximum value, etc.

The electronic device 100 may obtain the simulated KPI by inputting the input parameter in the input range to the simulator in operation S540. Here, an item of the simulated KPI may be the same as an item of the commercial network KPI obtained in operation S420 of FIG. 4.

The electronic device 100 may determine whether or not the calculated degree of similarity between the obtained commercial network KPI and the simulated KPI satisfies a completion condition in operation S550.

Here, the method of calculating the degree of similarity is described above. The completion condition may be predetermined. For example, the completion condition may be a condition for satisfying the predetermined number of repetitions or a condition of being greater than or equal to a predetermined degree of similarity.

When it is determined that the completion condition is not satisfied (NO at operation S550), the electronic device 100 may update the input parameter having the highest degree of similarity and the degree of similarity in operation S560. Also, when it is determined that the completion condition is not satisfied, the electronic device 100 may repetitively perform operations S510 to S550 in which the optimized input parameters are generated by using the repetition-based optimization algorithm on the updated input parameter.

When it is determined that the completion condition is satisfied (YES at operation S550), the electronic device may determine the input parameter having the highest degree of similarity as the final input parameter in operation S570.

The final input parameter determined according to the method, performed by the electronic device 100, of building the digital twin, may be determined as an input value for building the digital twin. Accordingly, the method of building the digital twin according to an embodiment of the disclosure may have various effects. For example, according to the method, the base station in the digital twin may operate by reflecting the characteristics of the base station in the commercial network.

According to an embodiment of the disclosure, an electronic device for building a digital twin may include a memory configured to store one or more instructions and a simulator of the digital twin, a transceiver, and at least one processor configured to execute the one or more instructions stored in the memory. The at least one processor may be configured to execute the one or more instructions to obtain at least one simulation key performance indicator (KPI) by inputting, to the simulator, information indicating whether or not a function of a commercial network base station is activated, an operation parameter related to an operation of the commercial network base station, and at least one input parameter to replicate the commercial network base station, which are received through the transceiver (130). The at least one processor may be configured to execute the one or more instructions to calculate a degree of similarity between the obtained at least one simulated KPI and at least one commercial network KPI received through the transceiver. The at least one processor may be configured to execute the one or more instructions to update the at least one input parameter based on the calculated degree of similarity.

The at least one processor may further be configured to execute the one or more instructions to update the at least one input parameter based on one or more optimized input parameters which are generated by using, on the at least one input parameter, a repetition-based optimization algorithm including at least one of a genetic algorithm (GA) or a particle swarm optimization (PSO) algorithm.

The at least one processor may further be configured to execute the one or more instructions to compare the calculated degree of similarity with a degree of similarity prestored in the memory, for example a pre-calculated degree of similarity and update a degree of similarity having a greater value and update the at least one input parameter corresponding to the degree of similarity having the greater value.

The at least one processor may further be configured to execute the one or more instructions to obtain the at least one input parameter for a plurality of predetermined times, based on the at least one commercial network KPI obtained from the commercial network base station for each predetermined time of the plurality of predetermined times.

The at least one processor may further be configured to execute the one or more instructions to obtain the at least one input parameter for a plurality of predetermined times, based on the at least one commercial network KPI obtained from the commercial network base station for each predetermined time of the plurality of predetermined times.

The at least one processor may further be configured to execute the one or more instructions to cluster the one or more optimized input parameters and determine a range of an input parameter in each cluster including the clustered one or more optimized input parameters.

The at least one processor may further be configured to execute the one or more instructions to calculate the degree of similarity between the at least one simulated KPI and the at least one commercial network KPI by using a mean absolute percentage error (MAPE).

An item of the at least one commercial network KPI and an item of the at least one simulated KPI may include at least one of throughput of a cell, a number of activated terminals, or a use amount of a physical resource block (PRB), collected at a predetermined time of the commercial network base station.

The operation parameter may include at least one of a handover parameter, a selection or re-selection parameter, a cell on/off parameter, or a load balancing parameter.

The information indicating whether or not the function is activated may include information about whether or not at least one of a scheduling algorithm, a handover algorithm, or a discontinuous reception (DRX) algorithm is activated.

The at least one input parameter may indicate at least one of an average packet size, an average request interval, or a number of terminals.

According to an embodiment of the disclosure, a method of building a digital twin may include obtaining information indicating whether or not a function of a commercial network base station is activated, an operation parameter related to an operation of the commercial network base station, and at least one commercial network key performance indicator (KPI), obtaining at least one simulated KPI by inputting, to a simulator, the information indicating whether or not the function is activated, the operation parameter, and at least one input parameter to replicate the commercial network base station, calculating a degree of similarity between the obtained at least one simulated KPI and the at least one commercial network KPI, and updating the at least one input parameter based on the calculated degree of similarity.

The updating of the at least one input parameter based on the calculated degree of similarity may include generating one or more optimized input parameters by performing, on the at least one input parameter, a repetition-based optimization algorithm including at least one of a genetic algorithm (GA) or a particle swarm optimization (PSO) algorithm and updating the at least one input parameter based on the one or more generated optimized input parameters.

The updating of the at least one input parameter may include comparing the calculated degree of similarity with a pre-stored degree of similarity, for example a previously-calculated degree of similarity, and updating a degree of similarity having a greater value and updating the at least one input parameter corresponding to the degree of similarity having the greater value.

The obtaining of the information indicating whether or not the function of the commercial network base station is activated, the operation parameter, and the at least one commercial network KPI may include obtaining the at least one input parameterfor a plurality of predetermined times, based on the at least one commercial network KPI obtained from the commercial network base station for each predetermined time of the plurality of predetermined times.

The generating of the one or more optimized input parameters may include clustering the one or more optimized input parameters and determining a range of an input parameter in each of clusters including the clustered one or more optimized input parameters.

The calculating of the degree of similarity between the obtained at least one simulated KPI and the at least one commercial network KPI may include calculating the degree of similarity between the at least one simulated KPI and the at least one commercial network KPI by using a mean absolute percentage error (MAPE).

An item of the at least one commercial network KPI and an item of the at least one simulated KPI may include at least one of throughput of a cell, a number of activated terminals, or a use amount of a physical resource block (PRB), collected at a predetermined time of the commercial network base station.

The operation parameter may include at least one of a handover parameter, a selection or re-selection parameter, a cell on/off parameter, or a load balancing parameter.

The information indicating whether or not the function is activated may include information about whether or not at least one of a scheduling algorithm, a handover algorithm, or a discontinuous reception (DRX) algorithm is activated.

The input parameter may indicate at least one of an average packet size, an average request interval, or a number of terminals.

Machine-readable storage media may be provided as non-transitory storage media. Here, the "non-transitory storage media" only denote tangible devices, not including a signal (for example, electromagnetic waves), and the term does not distinguish a case where data is stored in the storage media semi-permanently from a case where data is stored in the storage media temporarily. For example, the "non-transitory storage media" may include a buffer in which data is temporarily stored.

According to an embodiment of the disclosure, methods according to various embodiments of the disclosure described in this specification may be provided as an inclusion of a computer program product. The computer program product may be transacted between a seller and a purchaser, as a product. The computer program product may be distributed in a form of machine-readable storage medium (for example, a CD-ROM), or distributed (for example, downloaded or uploaded) through an application store or directly or online between two user devices (for example, smart phones). In the case of the online distribution, at least a part of the computer program product (e.g., a downloadable application) may be at least temporarily stored in a machine-readable storage medium, such as a server of a manufacturer, a server of an application store, or a memory of a relay server, or may be temporarily generated.

The invention claimed is:

1. An electronic device for building a digital twin with respect to a network base station, the electronic device comprising:

a memory configured to store one or more instructions and a simulator of the digital twin;

a transceiver; and at least one processor configured to execute the one or more instructions to:

obtain information indicating whether or not a function of an actual base station is activated, a setting parameter for an operation of the actual base station, and at least one actual key performance indicator (KPI);

obtain at least one simulated KPI by providing, to the simulator, the information indicating whether or not the function of the actual base station is activated, the setting parameter for the operation of the actual base station, and at least one input parameter to replicate the actual base station;

calculate a degree of similarity between the at least one simulated KPI and the at least one actual KPI;

compare the calculated degree of similarity with a previously-calculated degree of similarity; and update at least one target input parameter with the at least one input parameter, based on a result of the comparison.

2. The electronic device of claim 1, wherein the at least one processor is further configured to execute the one or more instructions to:

update the at least one input parameter based on one or more optimized input parameters which are generated by using a repetition-based optimization algorithm on the at least one input parameter, wherein the repetition-based optimization algorithm comprises at least one of a genetic algorithm (GA) or a particle swarm optimization (PSO) algorithm.

3. The electronic device of claim 1, wherein the at least one processor is further configured to execute the one or more instructions to:

update a target degree of similarity with the calculated degree of similarity, based on the result of the comparison, and update the at least one target input parameter with the at least one input parameter corresponding to the target degree of similarity.

4. The electronic device of claim 3, wherein the at least one processor is further configured to execute the one or more instructions to:

obtain the at least one input parameter for a plurality of predetermined times, based on the at least one actual KPI obtained from the actual base station for each predetermined time of the plurality of predetermined times.

5. The electronic device of claim 2, wherein the at least one processor is further configured to execute the one or more instructions to:

cluster the one or more optimized input parameters and determine a range of at least one input parameter in each cluster including the clustered one or more optimized input parameters.

6. The electronic device of claim 1, wherein the at least one processor is further configured to execute the one or more instructions to:

calculate the degree of similarity between the at least one simulated KPI and the at least one actual KPI by using a mean absolute percentage error (MAPE).

7. The electronic device of claim 1, wherein an item of the at least one actual KPI and an item of the at least one simulated KPI comprise at least one of throughput of a cell, a number of activated terminals, or a use amount of a physical resource block (PRB), collected at a predetermined time of the actual base station.

8. The electronic device of claim 1, wherein the setting parameter comprises at least one of a handover parameter, a selection or re-selection parameter, a cell on/off parameter, or a load balancing parameter.

9. The electronic device of claim 1, wherein the information indicating whether or not the function is activated comprises information about whether or not at least one of a scheduling algorithm, a handover algorithm, or a discontinuous reception (DRX) algorithm is activated.

10. The electronic device of claim 1, wherein the at least one input parameter comprises at least one of an average packet size, an average request interval, or a number of terminals.

11. A method of building a digital twin, the method comprising:

obtaining information indicating whether or not a function of an actual base station is activated, a setting parameter for an operation of the actual base station, and at least one actual key performance indicator (KPI);

obtaining at least one simulated KPI by providing, to a simulator, the information indicating whether or not the function of the actual base station is activated, the setting parameter for the operation of the actual base station, and at least one input parameter to replicate the actual base station;

calculating a degree of similarity between the at least one simulated KPI and the at least one actual KPI;

comparing the calculated degree of similarity with a previously-calculated degree of similarity; and updating at least one target input parameter with the at least one input parameter, based on a result of the comparison.

12. The method of claim 11, further comprising:

generating one or more optimized input parameters by using a repetition-based optimization algorithm on the at least one input parameter, wherein the repetition-based optimization algorithm comprises at least one of a genetic algorithm (GA) or a particle swarm optimization (PSO) algorithm; and updating the at least one input parameter based on the one or more optimized input parameters.

13. The method of claim 11, wherein the updating of the at least one target input parameter comprises:

updating a target degree of similarity with the calculated degree of similarity, based on the result of the comparison; and updating the at least one target input parameter with the at least one input parameter corresponding to the updated target degree of similarity.

14. The method of claim 12, wherein the generating of the one or more optimized input parameters comprises:

clustering the one or more optimized input parameters and determining a range of at least one input parameter in each cluster including the clustered one or more optimized input parameters.

15. The method of claim 11, wherein the calculating of the degree of similarity between the at least one simulated KPI and the at least one actual KPI comprises:

calculating the degree of similarity between the at least one simulated KPI and the at least one actual KPI by using a mean absolute percentage error (MAPE).

16. The method of claim 11, wherein an item of the at least one actual KPI and an item of the at least one simulated KPI comprise at least one of throughput of a cell, a number of activated terminals, or a use amount of a physical resource block (PRB), collected at a predetermined time of the actual base station.

17. The method of claim 11, wherein the setting parameter comprises at least one of a handover parameter, a selection or re-selection parameter, a cell on/off parameter, or a load balancing parameter.

18. The method of claim 11, wherein the information indicating whether or not the function is activated comprises information about whether or not at least one of a scheduling algorithm, a handover algorithm, or a discontinuous reception (DRX) algorithm is activated.

19. The method of claim 11, wherein the at least one input parameter comprises at least one of an average packet size, an average request interval, or a number of terminals.

20. A non-transitory computer-readable recording medium configured to store instructions which, when executed by at least one processor, cause the at least one processor to:

obtain information indicating whether or not a function of an actual base station is activated, a setting parameter for an operation of the actual base station, and at least one actual key performance indicator (KPI);

obtain at least one simulated KPI by providing, to a simulator, the information indicating whether or not the function of the actual base station is activated, the setting parameter for the operation of the actual base station, and at least one input parameter to replicate the actual base station;

calculate a degree of similarity between the at least one simulated KPI and the at least one actual KPI;

compare the calculated degree of similarity with a previously-calculated degree of similarity; and update at least one target input parameter with the at least one input parameter, based on a result of the comparison.

* * * * *